United States Patent [19]

Sagisaka et al.

[11] 4,348,728

[45] Sep. 7, 1982

[54] AIR-FUEL RATIO CONTROLLING METHOD AND APPARATUS THEREFOR

[75] Inventors: Yasuo Sagisaka, Kariya; Toshio Kondo, Anjo; Masahiko Tajima, Takahama, all of Japan

[73] Assignee: Nippondenso Co., Ltd., Kariya, Japan

[21] Appl. No.: 158,636

[22] Filed: Jun. 11, 1980

[30] Foreign Application Priority Data

Jun. 19, 1979 [JP] Japan ................................ 54-77079

[51] Int. Cl.³ ........................ G06F 15/20; F02D 5/00; F02B 3/12

[52] U.S. Cl. ............................... 364/431.06; 123/440; 123/480; 123/489; 364/431.05

[58] Field of Search ................ 364/431, 442; 123/416, 123/445, 480, 486, 489

[56] References Cited

U.S. PATENT DOCUMENTS

| | | | |
|---|---|---|---|
| 4,200,064 | 4/1980 | Engele | 123/440 |
| 4,201,161 | 5/1980 | Sasayama et al. | 123/486 X |
| 4,214,306 | 7/1980 | Kobayashi | 123/480 X |
| 4,224,910 | 9/1980 | O'Brien | 123/489 X |
| 4,240,390 | 12/1980 | Takeda | 123/480 |
| 4,257,377 | 3/1981 | Kinugawa et al. | 123/480 X |
| 4,265,208 | 5/1981 | Emmert et al. | 123/440 |
| 4,270,503 | 6/1981 | Pomerantz | 123/445 X |

*Primary Examiner*—Felix D. Gruber

*Attorney, Agent, or Firm*—Cushman, Darby & Cushman

[57] ABSTRACT

The air-fuel ratio of a mixture to be supplied to an engine is corrected by a microcomputer in accordance with integrated data produced by the process of integration performed in response to the output signal of an air-fuel ratio sensor for sensing the composition of exhaust gases from the engine and engine condition correction data corresponding to the then existing engine operating conditions. The necessary engine condition correction data are stored in the form of a map in a nonvolatile memory in accordance with the engine operating conditions as parameters. If, for example, any abnormal condition such as an abnormal rise in the temperature of a catalytic converter occurs, all the engine condition correction data in the nonvolatile memory are reset to a predetermined value.

7 Claims, 6 Drawing Figures

| Q \ N | 1 | 2 | 3 | ------- | n−1 | n | n+1 | ------- |
|---|---|---|---|---|---|---|---|---|
| 1 | $K_3(1,1)$ | $K_3(2,1)$ | $K_3(3,1)$ | | | | | |
| 2 | $K_3(1,2)$ | $K_3(2,2)$ | $K_3(3,2)$ | | | | | |
| 3 | $K_3(1,3)$ | $K_3(2,3)$ | $K_3(3,3)$ | | | | | |
| ⋮ | | | | | | | | |
| m−1 | | | | | $K_3(n-1,m-1)$ | $K_3(n,m-1)$ | $K_3(n+1,m-1)$ | |
| m | | | | | $K_3(n-1,m)$ | $K_3(n,m)$ | $K_3(n+1,m)$ | |
| m+1 | | | | | $K_3(n-1,m+1)$ | $K_3(n,m+1)$ | $K_3(n+1,m+1)$ | |
| ⋮ | | | | | | | | |

AIR-FUEL RATIO CONTROLLING METHOD AND APPARATUS THEREFOR

BACKGROUND OF THE INVENTION

The present invention relates to a method and apparatus for detecting the air-fuel ratio of an internal combustion engine from the composition of its exhaust gases and feedback controlling in accordance with the resulting detection signal the air-fuel ratio of a mixture to be supplied to the engine at a desired value.

Air-fuel ratio controlling methods known in the art are of the simple integral control type which is responsive to the output of an air-fuel ratio sensor. More specifically, the known methods are such that when the output of the air-fuel ratio sensor is indicative of a "lean mixture" state, the then current air-fuel ratio correction amount is simply changed to the rich mixture side and that when the sensor output is indicative of a "rich mixture" state, the then current air-fuel ratio correction amount is simply changed to the lean side. Thus, if, during a transitional engine operation, the base air-fuel ratio varies faster in speed than the correction by the integral control, the correction cannot follow the variation adequately. Also, in the event that the air-fuel ratio sensor is inactive, due to the fact that the feedback control of the air-fuel ratio will not be effected properly and so on, it is impossible to ensure a satisfactory air-fuel ratio control with the resulting deterioration of the exhaust gas emissions.

In view of these circumstances, the inventors have proposed a method of controlling the air-fuel ratio of a digital engine comprising an integration step for integrating the output signal of an air-fuel ratio sensor, and a storage step by which a value corresponding to the integrated data produced by the varying step is stored as an engine condition correction data in a nonvolatile read/write memory in accordance with the engine condition existing at the time of the integration step, whereby the air-fuel ratio of the engine is controlled in accordance with one of the engine condition correction data stored in the non-volatile memory which corresponds to the current engine condition and the integrated data.

This air-fuel ratio controlling method employing a nonvolatile memory is also disadvantageous in that if the engine misfires, the air-fuel ratio sensor is prevented from sensing an accurate air-fuel ratio thus failing to accurately control the air-fuel ratio of a mixture at a desired air-fuel ratio. For instance, if one of the engine cylinders fails to fire, the air-fuel ratio of the mixture supplied to the engine will be enriched to about 12.5 to 14:1 A/F. An engine condition correction data to be calculated from this wrong integrated data and stored in the memory (i.e., a data to be obtained by learning) will of course be a wrong one and it is not desirable to allow such a wrong correction data to be stored in the nonvolatile memory and used for air-fuel ratio controlling purposes. For instance, in the case of a system in which the integral control is stopped and the air-fuel ratio is increased when for example overheating of a catalyst forming an exhaust gas purifying device is detected from the occurrence of a misfire or the like, the utilization of such wrong correction data is also disadvantageous from the standpoint of preventing overheating of the catalyst in that the air-fuel ratio is also decreased or the mixture is enriched under the effect of the wrong correction data even if the integral control is being stopped. In other words, this type of known air-fuel ratio controlling method has the possibility of resulting in an erroneous air-fuel ratio control if there exists any fault condition in the engine system. In this case, the fault conditions of the engine system include for example the previously mentioned abnormal temperature rise in the catalytic converter as well as the detection by the air-fuel ratio sensor of "a rich mixture" state over a very long period of time, the detection of "a lean mixture" state over a very long period of time, the detection of a misfiring by a known type of misfire sensor and the disconnection of the wire harness interconnecting the air-fuel ratio sensor and the air-fuel ratio control unit proper.

SUMMARY OF THE INVENTION

With a view to overcoming the foregoing deficiencies in the prior art, it is the object of the present invention to provide an air-fuel ratio controlling method and apparatus capable of preventing any erroneous control of air-fuel ratio even in cases where there exists any fault condition in an engine system.

In accordance with the present invention, when a fault condition is detected in an engine system, all engine condition correction data stored in a memory are cleared (or restored to a predetermined value). Thus, even though there may be a tendency to store wrong engine condition correction data values upon occurrence of a fault condition in the engine, the air-fuel ratio will not deviate from the desired value to a large extent. Also, the memory is such that it retains its contents even when electrical power to the engine is shut off.

BRIEF DESCRIPTION ON THE DRAWINGS

DESCRIPTION OF THE PREFERRED EMBODIMENT

Figures 1, 6:
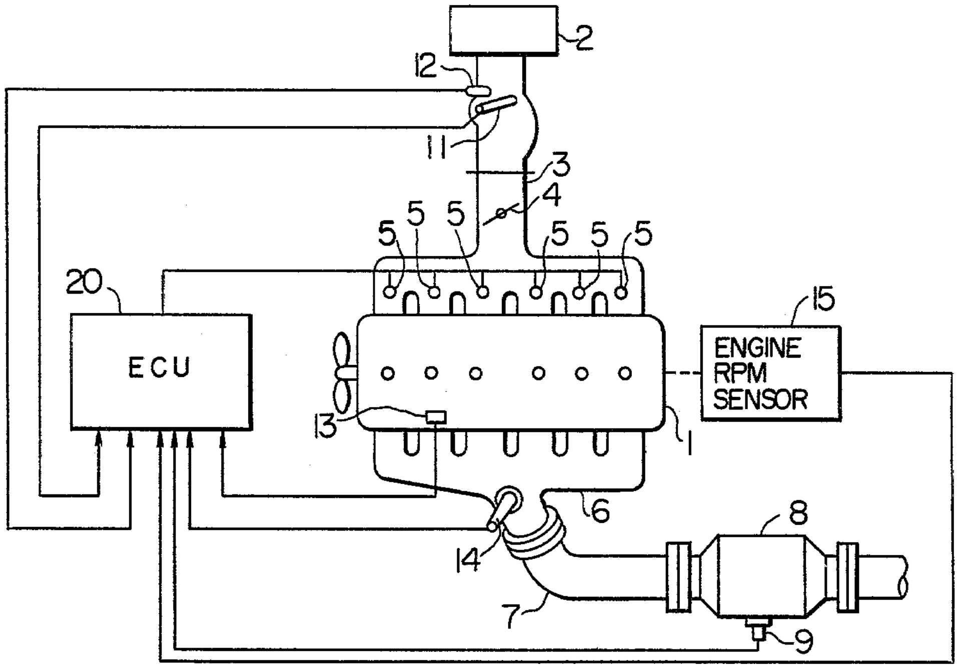
FIG. 1 is a schematic diagram showing the overall construction of an embodiment of the present invention.
FIG. 6 is a map of the values of correction amount $K_3$ which is useful for explaining the operation of the embodiment of FIG. 1.

The present invention will now be described in greater detail with reference to the embodiment shown in FIG. 1. An engine 1 is a known type of four-cycle spark ignition engine in which the combustion air is drawn by way of an air cleaner 2, an intake pipe 3 and a throttle valve 4. The fuel is supplied to the engine 1 from the fuel system (not shown) through electromagnetic fuel injection valves 5 which are provided for the respective cylinders. The exhaust gases resulting from the combustion are discharged into the atmosphere through an exhaust manifold 6, an exhaust pipe 7, a three-way catalytic converter 8, etc. Disposed in the intake pipe 3 are a potentiometer type intake air amount sensor 11 for sensing the amount of air drawn into the engine 1 and generating an analog voltage corresponding to the intake air amount and a thermistor type intake air temperature sensor 12 for sensing the temperature of the air drawn into the engine 1 and generating an analog voltage (analog detection signal) corresponding to the intake air temperature. Also mounted in the engine 1 are a thermistor type water temperature sensor 13 for sensing the cooling water temperature and generating an analog voltage (analog detection signal) corresponding to the cooling water temperature, and also mounted in the exhaust manifold 6 is an air-fuel ratio sensor 14 for sensing the air-fuel ratio of the mixture from the concentration of oxygen in the exhaust gases such that a voltage of about 1 volt (high level) is generated when the air-fuel ratio is smaller (richer) than a predetermined ratio (e.g., a stoichiometric ratio) and a voltage of about 0.1 volt (low level) is generated when the air-fuel ratio is greater (leaner) than the stoichiometric ratio. Mounted on the three-way catalytic converter 8 forming an exhaust gas purifying device is an exhaust temperature sensor 9 for sensing the temperature of the catalyst. An engine RPM sensor 15 generates a pulse signal having a frequency corresponding to the rotational speed. The engine RPM sensor 15 may for example be comprised of the ignition coil of the ignition system so that the ignition pulse signal from the primary terminal of the ignition signal is used as a rotational speed signal. A control circuit or ECU 20 is one which computes the desired fuel injection amount in accordance with the detection signals from the sensors 9, 11, 12, 13, 14 and 15, that is, the duration of opening of the electromagnetic fuel injection valves 5 is controlled to adjust the amount of fuel to be injected.

Figure 2:
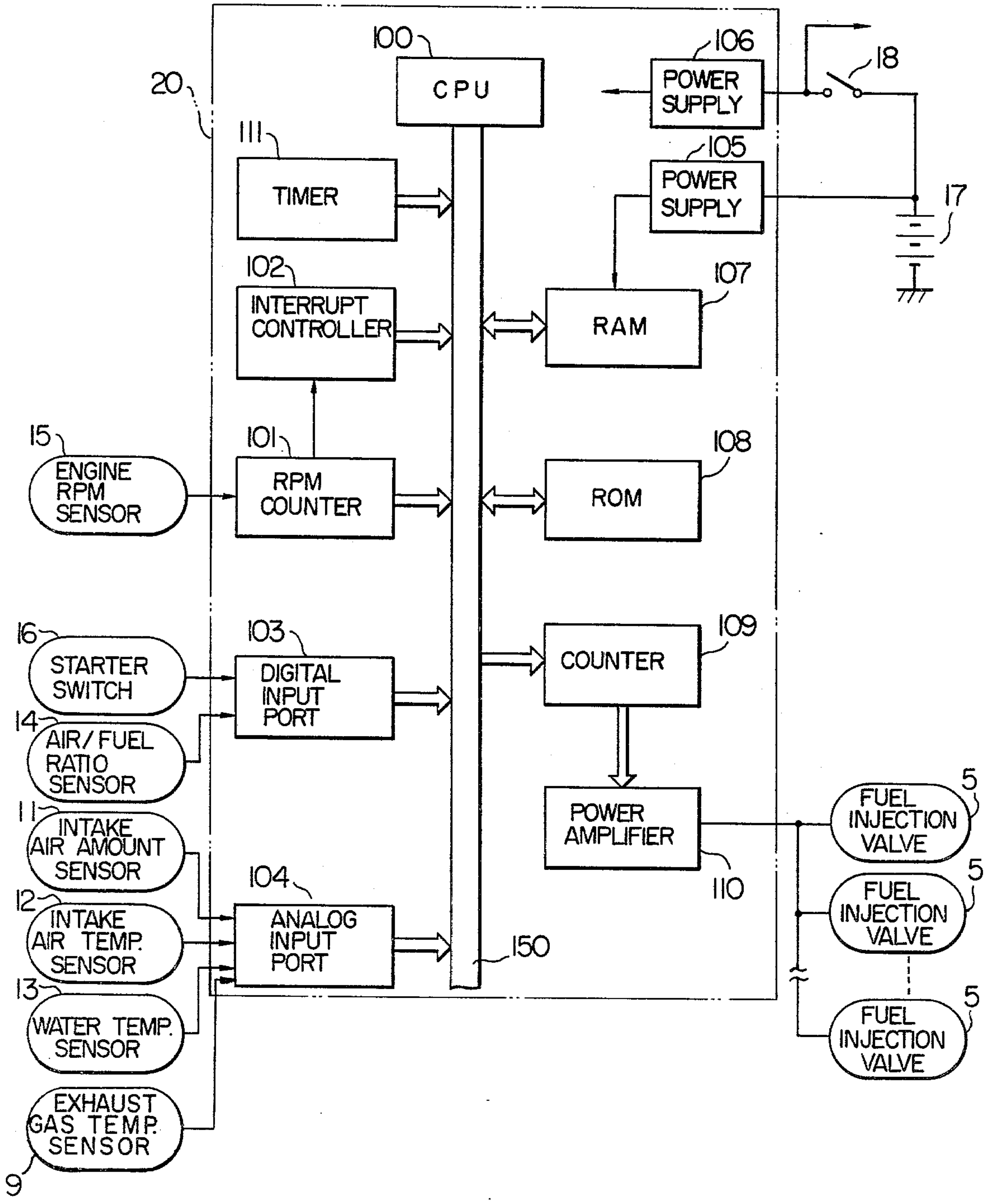
FIG. 2 is a block diagram of the control circuit shown in FIG. 1.

The control circuit 20 will now be described in greater detail with reference to FIG. 2. In the Figure, numeral 100 designates a microprocessor (CPU) for computing the amount of fuel to be injected. Numeral 101 designates an RPM counter which receives the signal from the engine RPM sensor 15 and generates a signal related to engine rpm. Also the RPM counter 101 sends an interrupt command signal to an interrupt controller 102 in synchronism with the engine rotation. In response to the interrupt command signal, the interrupt controller 102 applies an interrupt request signal to the microprocessor 100 through a common bus 150. Numeral 103 designates a digital input port for supplying to the microprocessor 100 such digital signals as the signal from the air-fuel ratio sensor 14 and the starter signal from a starter switch 16 for switching on and off the operation of the starter which is not shown. Numeral 104 designates an analog input port comprising an analog multiplexer and an A-D converter and adapted to function so that the signals from the exhaust temperature sensor 9, the intake air amount sensor 11, the intake air temperature sensor 12 and the cooling water temperature sensor 13 are sequentially subjected to A-D conversion and then are read into the microprocessor 100. The output data of these units 101, 102, 103 and 104 are supplied to the microprocessor 100 through the common bus 150. Numeral 105 designates a power supply for supplying power to a random access memory or an RAM 107 which will be described later. Numeral 17 designates a battery, and 18 a key switch. The power supply 105 is connected to the battery 17 directly and not through the key switch 18. As a result, the power is always applied to the RAM 107 irrespective of the key switch 18. Numeral 106 designates another power supply which is connected to the battery 17 through the key switch 18. The power supply 106 supplies power to the individual parts other than the RAM 107 which will be described later. The RAM 107 is a temporary memory unit which is used temporarily when a program is in operation and it comprises a nonvolatile memory which is always supplied with the power irrespective of the key switch 18 as mentioned previously so that the stored contents are not lost even if the key switch 18 is turned off and the operation of the engine is stopped. The RAM 107 also stores the values of correction amount $K_3$ which will be described later. Numeral 108 designates a read-only memory (ROM) for storing a program, various constants, etc. Numeral 109 designates a fuel injection time controlling counter including a preset data register which comprises a down counter whereby a digital signal indicative of the duration of opening of the electromagnetic fuel injection valves 5 or the fuel injection amount computed by the microprocessor or CPU 100 is converted into a pulse signal having a time width which determines the actual duration of opening of the electromagnetic fuel injection valves 5. Numeral 110 designates a power amplifier for actuating the fuel injection valves 5. Numeral 111 designates a timer for measuring and applying the elapsed time to the CPU 100.

The RPM counter 101 counts the output pulses of the RPM sensor 15 in a predetermined time interval to measure the engine RPM and applies an interrupt command signal to the interrupt controller 102 upon completion of each measurement. In response to the input signal, the interrupt controller 102 generates an interrupt request signal causing the microprocessor 100 to perform an interrupt handling routine for computing the amount of fuel to be injected.

Figure 3:
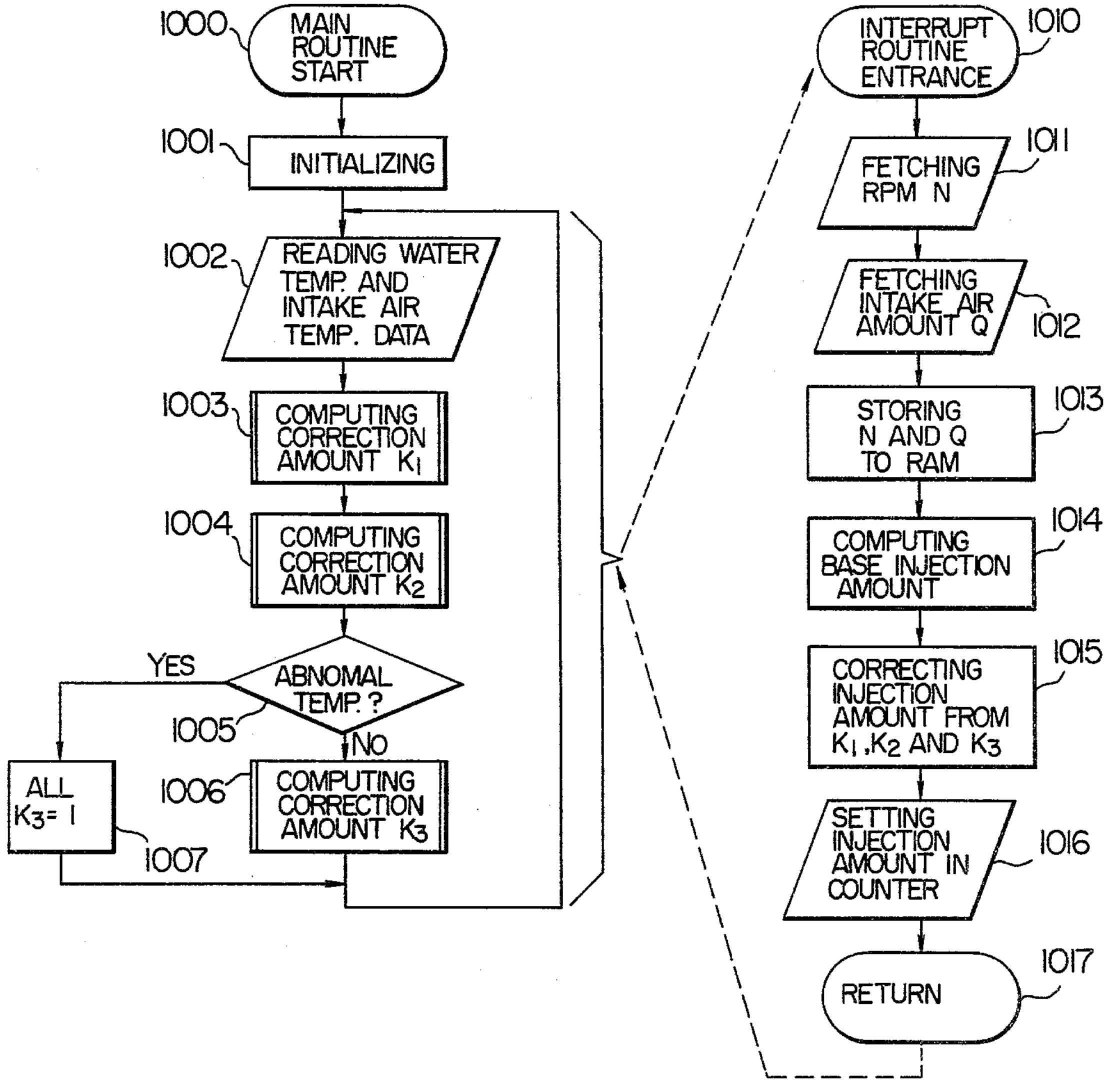
FIG. 3 is a brief flowchart of the microprocessor shown in FIG. 2.

FIG. 3 shows a brief flowchart of the microprocessor 100, and the overall operation of this embodiment will now be described with reference to the flowchart. When the key switch 18 and the starter switch 16 are turned on so that the engine 1 is started, a first step 1000 starts the computational operation of a main routine and the next step 1001 performs an initialization process. The next step 1002 reads in from the analog input port 104 the digital values indicative of the cooling water temperature and the intake air temperature. A step 1003 computes a correction amount $K_1$ corresponding to the cooling water and intake air temperatures and stores the same in the RAM 107. A step 1004 receives the output signal of the air-fuel ratio sensor 104 through the digital input port 103 so that a correction amount $K_2$ which will be described later is varied as a function of the elapsed time measured by the timer 111 and the resulting correction amount $K_2$ or the integrated data is stored in the RAM 107. The next step 1005 reads the output signal of the exhaust gas temperature sensor 9 and determines whether the catalyst temperature or the exhaust gas temperature is abnormal or higher than a predetermined value. If the temperature is not abnormal, the control is transferred to a step 1006 which computes another correction amount $K_3$ in response to the correction amount $K_2$ or the integrated data and stores the resulting value as an engine condition correction data in one of the storage locations of the RAM 107 corresponding to the engine condition existing at the time of this processing. If the step 1005 determines that the exhaust gas temperature is abnormal, the control is transferred to a step 1007 so that all the values of correction amount $K_3$ previously stored in the RAM 107 are cleared and reset to a predetermined value (a "1" in this embodiment).

Figure 4:
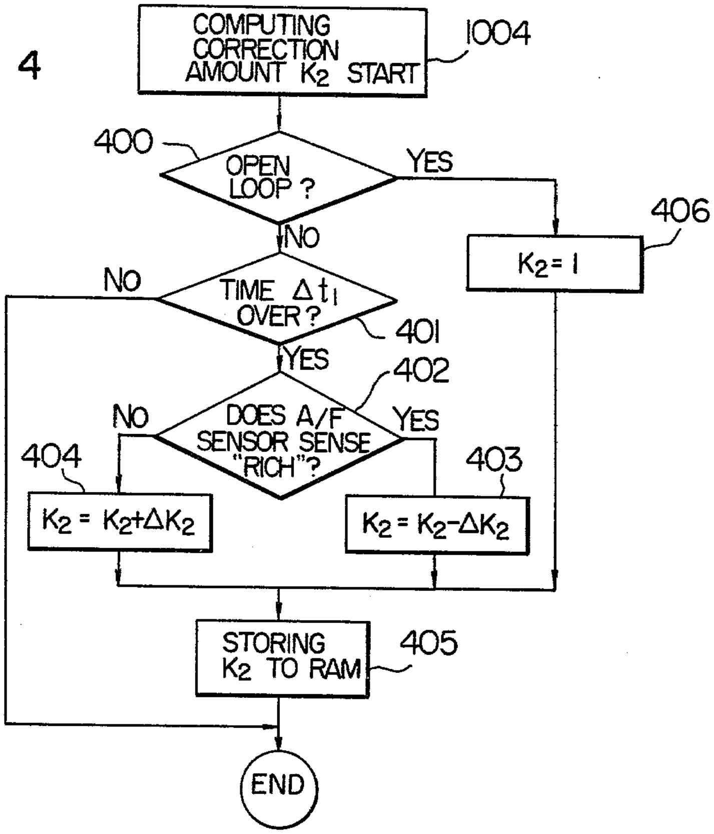
FIG. 4 is a detailed flowchart of the step 1004 shown in FIG. 3.

FIG. 4 shows a detailed flowchart of the process step 1004 for varying or integrating the correction amount $K_2$ or the integrated data. Firstly, a step 400 determines whether the $O_2$ sensor is active or not or determines whether the feedback control of the air-fuel ratio is possible in accordance with the cooling water temperature, etc. is not possible or in the case of an open loop, the control is transferred to a step 406 so that the correction amount $K_2$ is changed to $K_2=1$ and then the control is transferred to a step 405. If the feedback control is possible, the control is transferred to a step 401. The step 401 determines whether the elapsed time is greater than a unit time $\Delta t_1$ which is determined by the time lapsed from "END" of FIG. 4. If it is not, the correction amount $K_2$ is not corrected and the processing step 1004 is completed. This means that the value of $K_2$ does not vary at least in the unit time $\Delta t_1$. In other words, it means that the computation of $K_2$ is performed at intervals of the unit time $\Delta t_1$. If the unit time $\Delta t_1$ is just over, the control is transferred to a step 402 so that if the air-fuel ratio is rich and the output of the air-fuel ratio sensor 14 is a high level signal indicative of a rich mixture, the control is transferred to a step 403 so that the value of $K_2$ obtained by the previous cycle is decreased by an amount $\Delta K_2$ in an operation related to integration and then the control is transferred to the step 405. The newly computed correction amount $K_2$is stored as an integrated data into the RAM 107. If the step 402 determines that the air-fuel ratio is lean and the output of the air-fuel ratio sensor 14 is a low level signal indicative of a lean mixture, the control is transferred to a step 404 and the value of $K_2$ is increased by $\Delta K_2$. Then the control is transferred to the step 405. In this way, the correction amount $K_2$ is varied.

Figure 5:
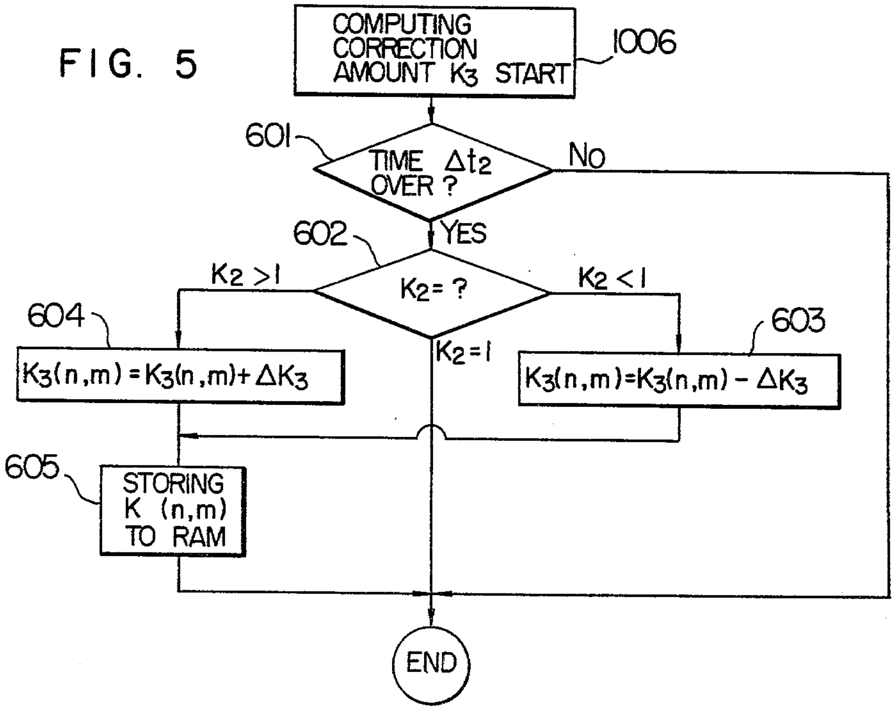
FIG. 5 is a detailed flowchart of the step 1005 shown in FIG. 3.

FIG. 5 is a detailed flowchart of the step 1006 for performing a storage process or computing the correction amount $K_3$ as an engine condition correction data. A step 601 determines whether the elapsed time is greater than a unit time $\Delta t_2$ so that if the unit time $\Delta t_2$ is not over, the storage process is completed. If the unit time $\Delta t_2$ is over, the control is transferred to a step 602 which in turn determines the value of $K_2$. This means that the value of $K_3$ remains unchanged at least during the time interval $\Delta t_2$. In other words, the computation of $K_3$ is performed at intervals of the unit time $\Delta t_2$. If $K_2=1$, the process step 1006 is completed without further processing. The values of correction amount $K_3$ stored in the RAM 107 are formed into a map as shown in FIG. 6 in accordance with the values of intake air amount or suction quantity Q and engine rpm N. $K_3$(n, m) represents the value of correction amount $K_3$ on the map which corresponds to the m-th intake air amount Q and the n-th engine rpm N. In the present embodiment, the map in the RAM 107 is such that the values of engine rpm N are arranged in steps of 200 rpm and the values of intake air amount Q are divided into 32 degrees for the operations ranging from the idle to the full throttle operation. If the step 602 determines that $K_2<1$, the control is transferred to a step 603 which in turn decreases the correction amount $K_3$(n, m) by $\Delta K_3$ and the resulting value is stored as an engine condition correction data in the RAM 107 by a step 605. If the step 605 determines that $K_2>1$, the control is transferred to a step 604 so that the correction amount $K_3$(n, m) obtained in the previous cycle is increased by $\Delta K_3$ and then the control is transferred to the step 605, thus completing the process step 1006. The completion of the step 1006 of the main routine returns the control to the step 1002.

The initialization process of the step 1001 also performs the following operation. More specifically, when a vehicle is inspected or repaired, there is the possibility of removing the battery. Thus, there is the possibility of the correction amounts $K_3$ stored in the respective storage locations of the RAM 107 being destroyed and changed into meaningless values. Thus, a constant of a predetermined bit pattern is preliminarily stored into a selected one of the storage locations of the RAM 107 so as to determine whether the battery has been removed. When the program is started, whether the value of the constant has been destroyed or it has been changed into a wrong value is determined. If the value is wrong one, it is considered that the battery has been removed and all the values of correction amount $K_3$ are initialized to "1" and the predetermined pattern constant is stored again in the memory. When the program is started next, if the pattern constant is not defective, the values of $K_3$ will not be initialized.

Usually, the main routine comprising the steps 1002 to 1007 shown in FIG. 3 is repeatedly performed according to the control program. When an interrupt request signal for fuel injection amount computation is applied to the microprocessor 100 from the interrupt control part 102, even if the main routine is being performed by the microprocessor 100, the running operation is immediately stopped and the control is transferred to the interrupt handling routine of a step 1010. A step 1011 fetches the output signal of the RPM counter 101 which is indicative of the engine rpm N. The next step 1012 fetches from the analog input port 104 the signal indicative of the intake air amount or suction quantity Q. The next step 1013 stores the engine rpm N and the suction quantity Q into the RAM 107 so as to be used as parameters for the storage process of correction amount $K_3$ in the computational operation of the main routine. The next step 1014 computes a base injection amount (or an injection time duration t of the electromagnetic fuel injection valves 5) which is dependent on the engine rpm N and the intake air amount Q. The expression for this computation is given by $t=F\times(Q/N)$ (where F is a constant). The next step 1015 reads from the RAM 107 the various fuel injection correction amounts computed by the main routine and then corrects the fuel injection amount (or the injection time duration) which determines the air-fuel ratio. The expression for computing the injection time duration T is given by $T=t\times K_1\times K_2\times K_3$. The next step 1016 sets the corrected fuel injection amount data into the counter 109. The control is then transferred to a step 1017 from which the control is returned to the main routine. When the control is returned to the main routine, the process step stopped by the interruption is resumed.

It will thus be seen that a large number of correction amounts $K_3$ are prepared in correspondence with the values of intake air amount and engine rpm and consequently the proper correction amount corresponding to the engine operating conditions can be readily used. Thus, the control with a fast response is ensured under all the operating conditions including transitional periods. Further, since the correction amounts $K_3$ are subjected to correction in dependence on the operating conditions, corrections can be automatically provided for changes and deterioration with time of the engine as well as the sensors. Further, even if the engine misfires so that the temperature of the exhaust gas purifying device or the catalyst rises abnormally, all the correction amounts $K_3$ are cleared to "1" so that there is no danger of wrong correction amounts being continuously computed and hence there is no danger of the air-fuel ratio control becoming inaccurate considerably.

Although the correction amounts $K_3$ are cleared to "1" in the above-described embodiment upon occurrence of the abnormal condition, they may be cleared to another value. Namely, for example, they may be cleared to "0.9" so that the air-fuel ratio may be controlled at a lean-mixture side.

While, in the embodiment described above, the air-fuel ratio is controlled by correcting the amount of fuel injection in the electronically controlled fuel injection, the present invention can of course be applied to cases where the air-fuel ratio is controlled by correcting the correction amounts for the amount of fuel supplied into the carburetor or the amount of additional air supplied into the engine exhaust system.

Further, while, in the above embodiment, the RAM 107 is backed up by the power supply so that the entire RAM 107 turns out to be a nonvolatile memory, only that part of the RAM 107 which is used for learning control purposes (e.g., only the storage locations into which the values of $K_3$ are stored) may be backed up by the power supply so as to change it into a nonvolatile memory. Still further, instead of backing up the RAM 107 by the power supply, the RAM 107 may be comprised of a nonvolatile memory such as an MNOS (metal nitride oxide silicon) memory.

We claim:

1. A method of controlling the air-fuel ratio of a mixture to be supplied to an internal combustion engine comprising the steps of:

monitoring at least one operating condition of said engine to determine if said at least one operating condition is abnormal;

storing in a first storage location of memory means integrated data read out from said first storage location and integrated in accordance with an output signal of an air-fuel ratio sensor for sensing the air-fuel ratio from the composition of exhaust gases therefrom;

storing in one of a plurality of second storage locations of said memory means engine condition correction data read out from said one of second storage locations in accordance with then existing operating conditions of said engine and corrected in accordance with said stored integrated data;

determining a basic mixture air-fuel ratio control amount in accordance with said engine operating conditions and correcting said basic air-fuel ratio control amount in accordance with said integrated data and said corrected engine condition correction data; and resetting all of the engine condition correction data stored in said second storage locations of said memory means to a predetermined value when said at least one engine condition is abnormal.

2. A method according to claim 1, wherein at least the second storage locations of said memory means are formed by a nonvolatile memory.

3. A method according to claim 2, wherein said nonvolatile memory is a random access memory backed up by power supply means.

4. A method according to claim 1, wherein said integrated data and correction data storing steps and said resetting step are all performed as part of a main routine by a microprocessor, and wherein said step of determining and correcting a basic air-fuel ratio control amount is performed as an interrupt handling routine by said microprocessor in response to a periodic interrupt request signal applied thereto from interrupt control means.

5. A method according to claim 1, wherein said integrated data storing step includes:

determining whether the output signal of said air-fuel ratio sensor is indicative of "a rick mixture;" and increasing or decreasing said integrated data by a predetermined value in response to the result of said sensor output signal determining step.

6. A method according to claim 1, wherein said engine condition correction data storing step includes:

comparing said integrated data and a predetermined value in magnitude; and increasing or decreasing said engine condition correction data corresponding to then existing engine operating conditions by a predetermined value in accordance with the result of said magnitude comparing step.

7. An apparatus for controlling the air-fuel ratio of a mixture to be supplied to an internal combustion engine comprising:

sensor means for sensing various operating conditions of said engine, said sensor means including an air-fuel ratio sensor for sensing the air-fuel ratio from the composition of exhaust gases therefrom;

input port means connected to said sensor means to receive therefrom data indicative of operating conditions of said engine;

timer means for measuring an elapsed time interval;

interrupt control means for generating an interrupt request signal;

random access memory means at least part of which functions as a nonvolatile memory;

read-only memory means storing a program and constants;

a presettable counter;

power amplifier means connected to said presettable counter to drive fuel injection valve means for an interval of time corresponding to the content of said counter; and a microprocessor connected to said input port means, said timer means, said interrupt control means, said random access memory means, said read-only memory means and said presettable counter to respond to starting of said engine to initialize said random access memory means in accordance with said program stored in said read-only memory means and execute said program comprising the following steps as a main routine:

at intervals of a time determined by an elapsed time indicative data from said timer means, increasing or decreasing integrated data read out from said random access memory means by a predetermined value in accordance with output signal data of said air-fuel ratio sensor read out from said input port means and storing said varied integrated data in said random access memory means;

determining whether engine operating condition indicative data read out from said input port means is indicative of an abnormal condition;

when said engine is not in abnormal condition, at intervals of another time determined by another elapsed time indicative data from said timer means, increasing or decreasing correction data read out from one of storage locations of said nonvolatile memory part determined by said engine operation condition indicative data by a predetermined value in accordance with the value of said varied integrated data and storing said varied correction data in said one of storage locations of said nonvolatile memory part;

when said engine is in abnormal condition, resetting all the correction data stored in said storage locations of said nonvolatile memory part to a predetermined value;

said microprocessor being responsive to said interrupt request signal from said interrupt control means to execute as an interrupt handling routine the following steps of said program in said read-only memory means;

reading said engine operating condition indicative data from said input port means and storing the same in said random access memory means;

computing a base fuel injection amount in accordance with said engine operating condition indicative data stored in said random access memory means;

correcting said computed base fuel injection amount in accordance with said varied integrated data and said varied correction data stored in said random access memory means; and setting a value corresponding to said corrected fuel injection amount in said presettable counter.

* * * * *